Feb. 26, 1929.

A. LANZKRON 1,703,154

VEGETABLE SLICER

Filed July 5, 1927

Inventor:
Anna Lanzkron.
BY
atty.

Patented Feb. 26, 1929.

1,703,154

UNITED STATES PATENT OFFICE.

ANNA LANZKRON, OF HAMBURG, GERMANY.

VEGETABLE SLICER.

Application filed July 5, 1927, Serial No. 203,583, and in Germany May 13, 1927.

This invention relates to an improvement in vegetable slicers designed particularly for accommodating vegetables which from their character are difficult to slice in an even, regular manner.

The main object of the invention is the provision of relatively adjustable plates formed with longitudinally ranging slots between which plates the vegetable is temporarily held to permit a knife to be passed longitudinally of the slots to slice the vegetable.

A further object is the provision of means whereby the vegetable may be more or less fixed on all sides during the slicing operation, whereby to facilitate regular slicing without tendency to mash the vegetable.

The invention is illustrated in the accompanying drawings, in which.

Figure 1:
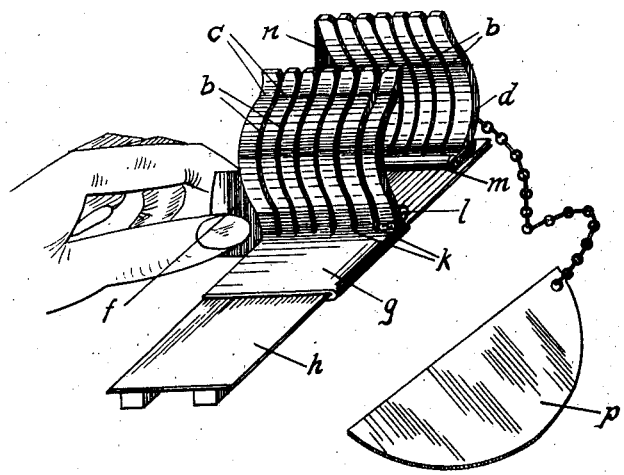
Figure 1 is perspective view of the improved slicing device.
Figure 2:
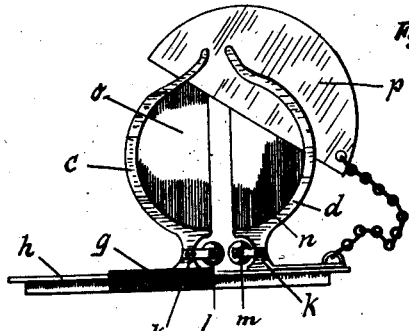
Figure 2 is a side view of the same.
Figure 3:
Figure 3 is a broken elevation of the knife.

The improved vegetable slicer comprises a base $h$ on which near one end is fixed a retaining plate $d$ of concavo-convex form having a series of regularly spaced longitudinally ranging slots $b$ opening through the upper edge of the plate. A similar retaining plate $c$ is slidably mounted upon the base $h$ through the medium of an extension $g$, the edges of which are turned beneath the edges of the base to permit the movement of the plate $c$ toward and from the plate $d$. The plate $c$ is also formed with longitudinally ranging slots $b$ which open through the upper edge of the plate, the slots of the respective plates being in registry longitudinally of the base to provide a common cutting guide.

It is of course apparent that the plate $d$, as well as the plate $c$, may be made longitudinally adjustable of the base $h$ and that any conventional means, such as a set-screw or the like (not shown), may be provided to fix either or both plates in their relatively adjusted positions. One or both of the plates, accordingly as one or both are adjustable, may be provided with a lateral extension $f$ serving as a finger-piece for the convenient adjustment of the plates.

The respective plates are provided on a similar edge with an end wall, such end wall $n$ of the plate $d$ being, of course, aligned with the end wall $o$ of the plate $c$ to form an abutment at one end of the device against which the vegetable may be held during the slicing operation. A second and opposite abutment is provided by a plate $p$, preferably forming an inseparable part of the device through a chain connection, which plate $p$ may be inserted in any pair of aligned slots of the respective plates to confine the vegetable between said plate $p$ and the end walls $n$ and $o$. The plate $d$ carries at its lower end a roller $m$ preferably of cork or the like to prevent the edge of the knife or cutting implement coming into contact with the base, a similar roller $l$ being carried by the plate $c$.

The vegetable to be sliced is placed between the plates $c$ and $d$, and the plates adjusted to confine the vegetable under slight pressure. The movable wall $p$ is positioned in the particular aligned slots to confine the vegetable between it and the end walls $n$ and $o$, following which the knife $a$ may be passed longitudinally of the respective aligned slots in succession to slice the vegetable uniformly and evenly. Of course, there is no limitation as to the number or relative spacing of the slots $b$ nor as to the particular length of the plates transverse the base $h$. If it is desired to cut the vegetable into string or cube formation, such vegetable may be sliced in one direction, then turned at right angles and sliced into string form and turned again at right angles and cut into cube form.

The implement as a whole is conveniently portable and may be used as a kitchen utensil for the dividing of fruits, vegetables and the like in a simple and expeditious manner.

What I claim to be new is:

1. A vegetable slicing apparatus comprising relatively adjustable concavo-convex plates, each formed with longitudinally ranging slots, and means carried by the plates to confine the vegetable in a direction at right angles to the plates, said means including end walls carried by the plates and an end wall removably secured in any pair of aligned slots.

2. A vegetable slicer comprising a base, a pair of concavo-convex plates carried by the base, one of said plates being adjustable longitudinally of the base, each of the plates being formed with longitudinally ranging slots to receive and guide a knife through a vegetable held between the plates, and flexible knife limiting rollers carried by the plates above the lower ends of the slots and the base.

3. A vegetable slicer comprising a base, a pair of concavo-convex plates carried by the base, one of said plates being adjustable longitudinally of the base, each of the plates being formed with longitudinally ranging slots to receive and guide a knife through a vegetable held between the plates, an end wall carried by each plate, and a removable wall to cooperate with any pair of aligned slots of the plates and the walls on the end plates to vary the vegetable receiving space.

In testimony whereof I affix my signature.

ANNA LANZKRON. [L. S.]